United States Patent [19]
Russell et al.

[11] Patent Number: 5,122,280
[45] Date of Patent: Jun. 16, 1992

[54] METHOD AND APPARATUS FOR SEPARATING OIL FROM OIL/WATER MIXTURES

[75] Inventors: Brandon Russell; Frederick E. Russell, both of Elgin, Ill.

[73] Assignee: Protectaire Systems, Co., Elgin, Ill.

[21] Appl. No.: 630,025

[22] Filed: Dec. 19, 1990

Related U.S. Application Data

[63] Continuation of Ser. No. 110,308, Oct. 20, 1987.

[51] Int. Cl.⁵ .......................................... B10D 17/032
[52] U.S. Cl. ................................... 210/745; 210/800; 210/805; 210/532.1; 210/538; 210/540
[58] Field of Search ............... 210/538, 540, 739, 740, 210/744, 746, 800, 805, 532.1

[56] References Cited

U.S. PATENT DOCUMENTS

| | | | |
|---|---|---|---|
| 2,946,443 | 7/1960 | Schmidt | 210/742 |
| 3,275,565 | 9/1966 | Sailors | 210/540 |
| 4,608,160 | 8/1986 | Zoch | 210/540 |
| 4,762,614 | 8/1988 | Figiel et al. | 210/540 |
| 4,880,533 | 11/1989 | Hondulas | 210/744 |

Primary Examiner—Stanley S. Silverman
Assistant Examiner—Neil M. McCarthy
Attorney, Agent, or Firm—Fitch, Even, Tabin & Flannery

[57] ABSTRACT

Disclosed is method and apparatus for separating a light liquid component from a heavier liquid component. A holding tank holding a mixture of the light and heavy liquid has an outlet discharging into a separation tank. An underflow weir is provided in a separation tank adjacent the point of discharge to direct outflow beneath the surface underflow weir and the light liquid rises to the surface on the downstream side of the underflow weir to concentrate in a small vertical column in a portion of the separation tank to form an upper layer. A sensor in the separation tank senses sufficient light liquid in the vertical column and operates a removal pump to remove the light liquid from the vertical column. With removal of the light liquid, heavy liquid rises and the sensor senses the heavy liquid and stops the light liquid removal before the heavy liquid is also removed. Heavy liquid from the separation tank is recirculated, being directed across the surface of the holding tank in a downstream direction.

3 Claims, 4 Drawing Sheets

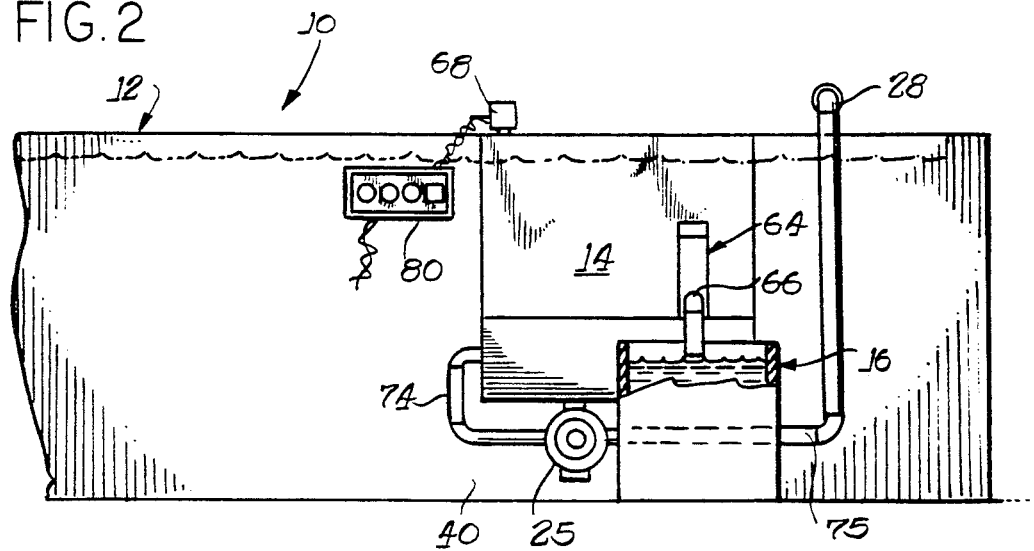
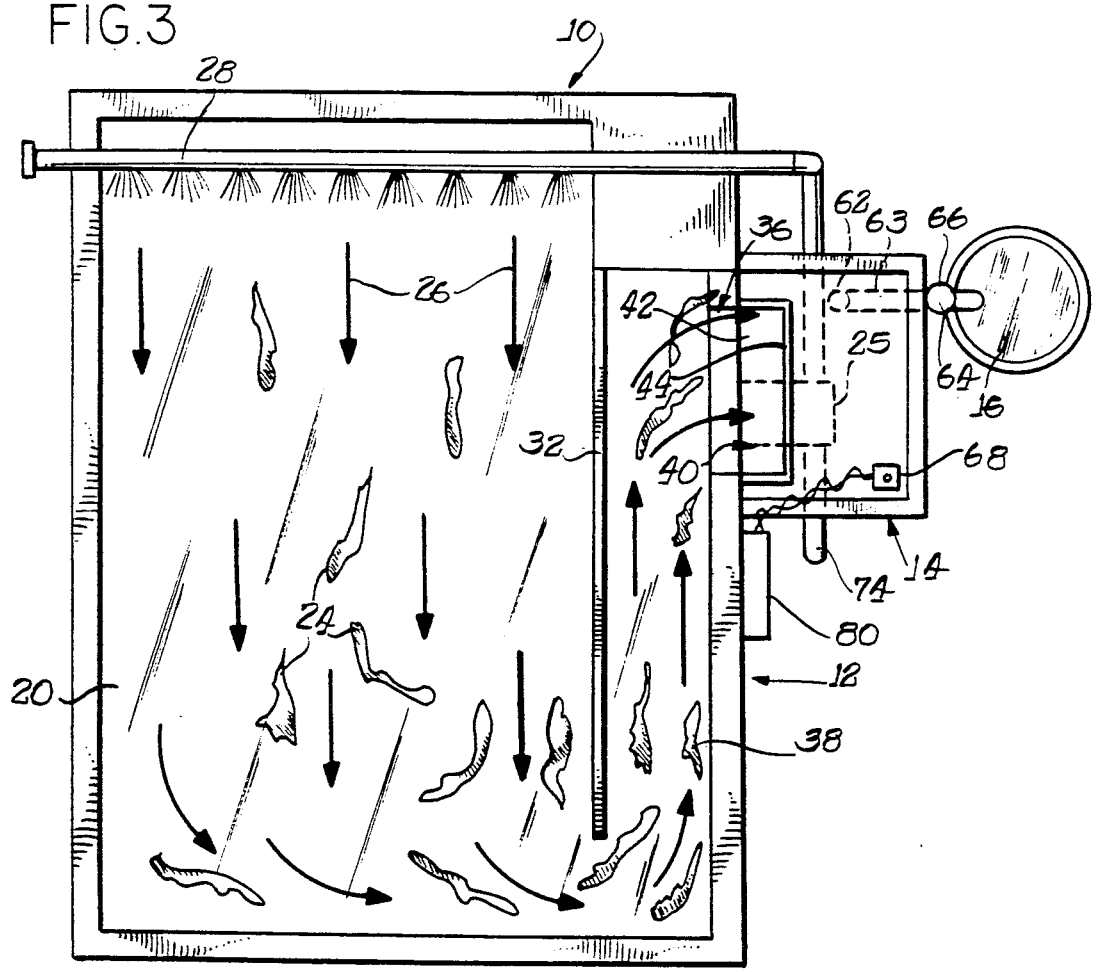

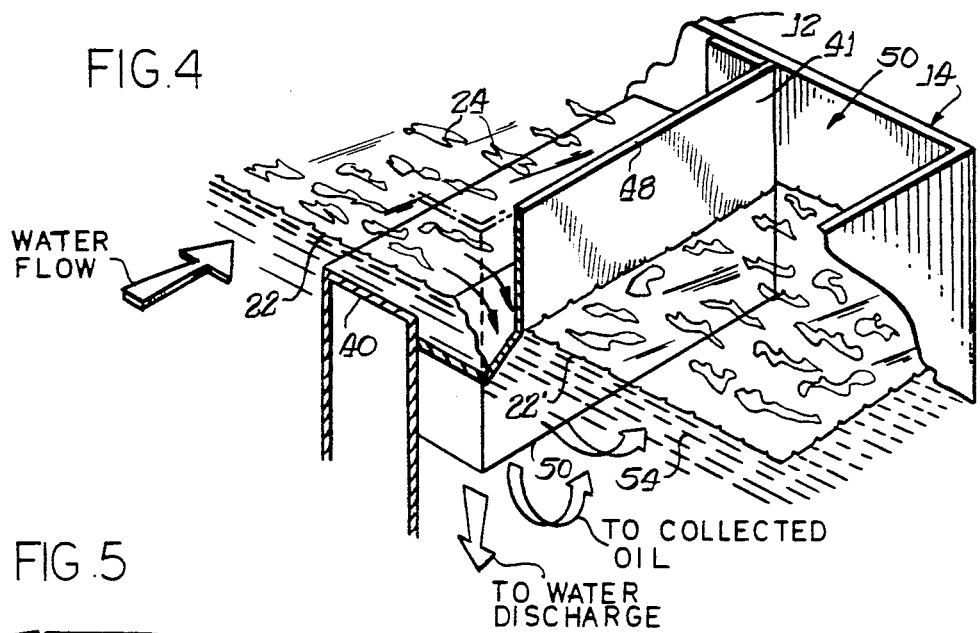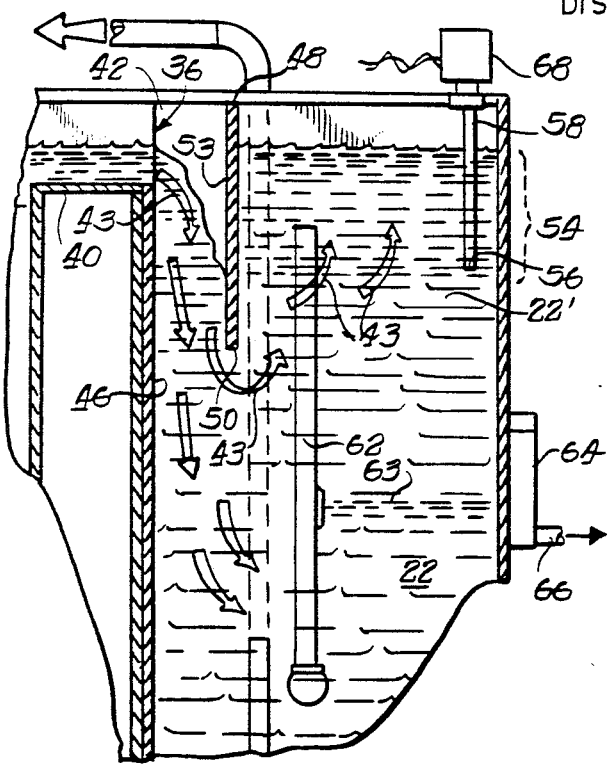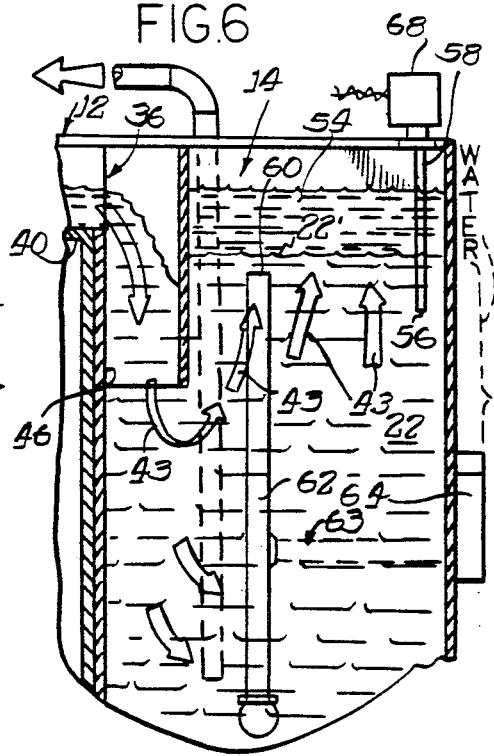

METHOD AND APPARATUS FOR SEPARATING OIL FROM OIL/WATER MIXTURES

This is a continuation of U.S. application Ser. No. 110,308, filed Oct. 20, 1987.

BACKGROUND OF THE INVENTION

1. Field of the Invention

The present invention pertains to liquid treatment methods and devices, and more particularly to the separation of a lighter floating liquid on the top of a body of a second liquid. Herein, the invention will be described in connection with the separation of an oil component floating on a body of water although the invention may be used to separate other liquids, also.

2. Description of the Prior Art

Over the years, various arrangements have been proposed for removing oil from an oil/water mixture. One popular arrangement includes a rotatable drum, the majority of which is above the level of the oil/water mixture, but which establishes contact with the mixture's surface over a relatively small portion of the drum surface. As the drum rotates, oil floating on the surface of the mixture adheres to the drum and is maintained there due to the surface tension of the oil. Occasionally, costly chemicals must be added to the floating oil to enhance adhesion to the drum surface. A doctor blade scraps the surface of the drum, separating the oil film therefrom. In general, it has been found that this type of oil separation system lacks the separation efficiency necessary to provide an oil removal rate required in some production environments. While additional drums could be added if the tank holding the oil/water mixture were large enough, the cost of doing so is frequently prohibitive, especially considering the initial high investment cost required for even a single drum system. Further, systems of this type required frequent maintenance, thereby adding to the cost of operation.

The present invention will be described hereinafter in connection with a preferred use thereof which is with a washer for washing oil or grease from parts prior to a further treatment of the parts such as by spray painting. Often in the manufacture of products, particularly metal products, a coat of grease or oil remains on the product prior to its being spray painted and the part is washed by an aqueous alkaline spray. The spray rinses the oil coat from the product and the oil drops into an underlying tank in which the water is collected and pumped backed to spray nozzles which again spray the water against other products to remove any oil film thereon. This recirculation and cleansing with water continues, and after a while the body of water accumulates a substantial coating or film of oil on the surface of the water in the tank. When the oil becomes too deep, it has been removed by either the above-described rotatable drum or by a manual operation of opening a water inlet valve to admit more water into the tank to overflow the top layer of oil and water from the tank into an overflow gutter which directs the overflowing oil and water into collection drums. Often the overflow is 50% to 70% water and it is very costly to dispose of water. Because the oil spreads over the entire tank surface, a large quantity of oil may be present but spread into a thin film to be removed effectively by a manual overflow. The rotating roller apparatus described above is costly and is not that efficient.

Whatever is removed from the washer tank is processed as chemical or hazardous waste and, as such, at a high cost. Thus, where the quantity of water that is skimmed with the oil is equal to or greater than the quantity of oil, the storage cost may be doubled for storing water as a hazardous waste product. By substantially removing only oil with very little or no water, the hazardous waste product disposal can be reduced substantially.

Manifestly, the oil and water separation apparatus disclosed herein may be used with other apparatus than a washer booth and could be used, for example, to separate oil and water in a machine apparatus where large quantities of oil are recycled and reused in the process. Also, with suitable booms for containing oil slicks, the present invention may be used to remove floating oil spills or slicks from lakes, streams and oceans. The present invention provides a low cost and relatively maintenance-free system that removes substantially only oil, e.g. 98% to 99% oil from the surface of a body of water.

SUMMARY OF THE INVENTION

Accordingly, it is an object of the present invention to provide methods and apparatus for separating a light liquid component, such as oil, from a mixture of the light liquid component and a heavy liquid component, such as water.

A further object of the invention is to induce process water to flow from a main holding tank into an oil separator tank at which the oil is concentrated and removed and the process water is recirculated to the main holding tank.

Another object of the present invention is to provide an apparatus of the above-described type which can be economically assembled from a minimum number of inexpensive parts, and which requires minimum maintenance for its successful operation.

Yet another object of the present invention is to provide apparatus of the above-described type providing an increased collection efficiency.

These and other objects of the present invention which will become apparent from studying the appended description and drawings are provided in an apparatus for separating a light liquid component from a mixture of the light liquid component and a heavier liquid component. The apparatus is adapted to be attached to a separate main containing means such as a holding tank or the apparatus itself may include the main holding tank holding the mixture and having a reduced area outlet at the level of the surface liquid. A recirculating and flow inducing means causes an outflow of the mixture through the first tank outlet into a second, smaller tank which collects the outflow, and forms a thicker upper layer of the light liquid component from the outflow. The induced outflow passes beneath an underflow weir or baffle and the lighter component rises on the downstream side of the underflow weir in a vertical column of increased thickness. Sensor means located in the second tank adjacent the surface generates an output signal when a sufficient depth of the lighter component is present for removal as by a pump. Removal means for removing the contents of the second tank from the adjacent surface thereof, operate to initiate removal in response to the output signal and to discontinue removal in response to a second signal that the heavier component will be removed if the removal pump is allowed to continue to operate.

The preferred flow inducing means includes a recirculation pump which removes the heavier component from the second smaller tank and returns the heavier component to the top surface of the first tank for recirculation across the top surface of the first tank.

Further objects of the present invention are also provided in a method of separating a light liquid from a mixture of the light liquid and a heavier liquid, comprising the steps of:

providing a holding tank having an outlet, and providing a separation tank in flow communication with the outlet of the holding tank, inducing an outflow of the mixture through the holding tank outlet, maintaining a quantity of at least the heavier liquid component in the separation tank, at an elevation substantially common to both the holding tank and the separation tank, flowing the outflow beneath an underflow weir and allowing the light liquid component of the mixture induced into the separation tank to rise in a vertical column above the heavy liquid component on the downstream side of the backflow weir, sensing when the depth of the lighter component on the downstream side of the backflow weir has sufficient depth for removal, removing the lighter component from the separation tank after sensing that a sufficient depth is present for removal, and discontinuing removal of lighter components from the separation tank upon sensing that the depth of the lighter component is too small thereby avoiding a substantive removal of the heavier component along with the lighter component.

BRIEF DESCRIPTION OF THE DRAWINGS

In the drawings, wherein like elements are referenced alike.

FIG. 2 is a front elevational view of the apparatus of FIG. 1;

FIG. 3 is a top plan view of the apparatus of the preceding Figures;

FIG. 4 is an enlarged fragmentary view, taken in perspective, of the juncture of the larger holding tank and smaller separation tank of the preceding Figures;

FIG. 5 is a cross-sectional view of the separation tank of the preceding Figures shown prior to removal of a layer of floating oil;

FIG. 6 is a cross-sectional side elevational view corresponding to FIG. 5, but taken immediately after the oil layer has been pumped out;

DETAILED DESCRIPTION OF THE PREFERRED EMBODIMENT

Figure 1:
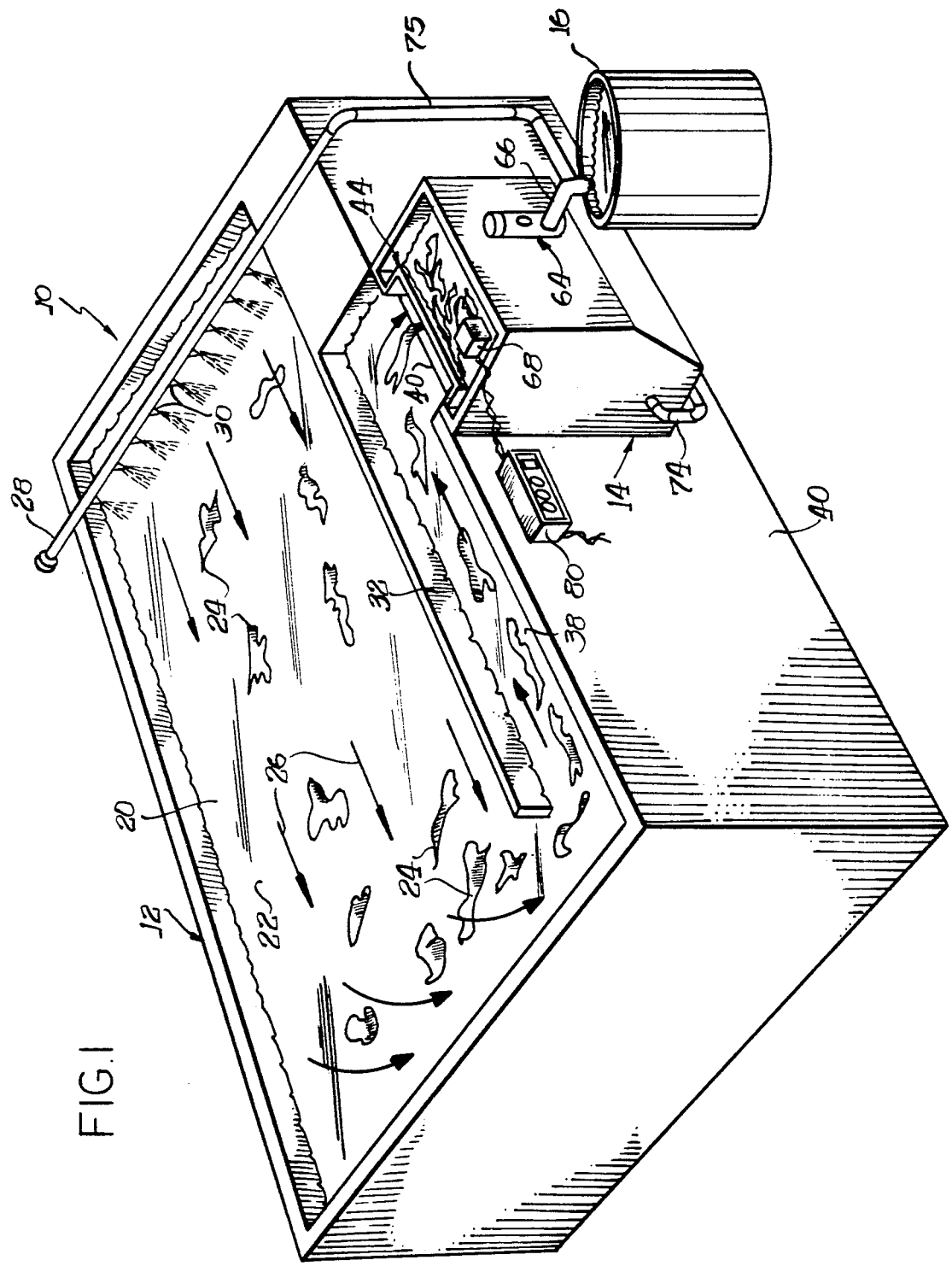
FIG. 1 is a perspective view of apparatus for separating oil from oil/water mixtures, illustrating aspects of the present invention.

As shown in the drawings for purposes of illustration, the invention is embodied an apparatus 10 for separating a liquid having a lighter specific gravity, such as oil, from the surface of a second liquid having a higher specific gravity such as water. The water and oil mixture may be contained within any containing means such as a tank, a pit, or a floating boom structure encircling an oil spill. The apparatus being claimed herein and manufactured by the assignee of this invention may or may not include a containing means such as the illustrated holding tank 12. Thus, a separation tank 14 may be either attached to the holding tank at the manufacturing plant or the separation tank may be brought to the site of an existing holding tank and an opening may be cut in the holding tank wall to allow the water and oil to flow through the opening into the separation tank after its attachment to the holding tank. Manifestly, the separation tank need not be a separate tank but may be a partitioned-off portion within the main holding tank.

The holding and separation tanks of the preferred embodiment as illustrated in the Figures have a generally rectangular form, although other configurations may be used. Although not shown in the figures, the illustrated holding tank 12 is located beneath well-known and conventional spray nozzles of a parts degreaser which sprays the parts with a water-based washing medium (typically a caustic solution) to dislodge or otherwise wash oil and grease from the surfaces of a machine part or the like, with the grease and oil so removed becoming mixed with the water-based medium. The oil is generally considered to be a waste product, having no further utility to the operation of the parts degreaser. The water is reused and recirculated to spray nozzles from the tank. The overspray and water on the parts drops back into the underlying tank. In order to reduce disposal costs, it is generally desirable to restrict as much as possible the volume of material being disposed of. Accordingly, it is desirable to reduce the water component of the oil/water mixture by separating out the oil component to be disposed of, and reusing the water component in subsequent operations.

As will be seen, the oil separation apparatus 14 of the present invention discharges highly concentrated oil into a waste receptacle 16 which can conveniently comprise a sealable drum useful in transporting the oil to a remote location.

The contents of holding tank 12, designated by the reference numeral 20, in general terms, comprises a mixture of two or more liquids, with the liquid to be separated out being lighter than the remaining component(s) of the mixture. Herein the term "liquid" is used in its normal sense to include generally non-solid materials, i.e., materials that can be made to flow (whether or not at ambient temperature) and specifically includes relatively viscous materials such as oils of various types, dissolved or suspended greases and the like. According to one aspect of the present invention, the term "liquid" includes materials which are both polar and non-polar. As will be seen, in describing the preferred embodiment, the non-polar liquid may comprise one or more types of oils and the polar liquid may comprise water, a common medium for transporting oils away from a work station. Accordingly, sensors for detecting the presence of one of the components of the mixture conveniently test the electrical resistivity of the material they contact.

However, as will be appreciated by those skilled in the art, the present invention is equally applicable to other types of mixtures of light and heavy liquids other than oil and water. For example, the present invention is equally applicable to a mixture of two oils and is also applicable to a mixture of two organic chemicals. In each example, the two liquid components are immiscible with respect to each other, and one component is lighter than the other so as to be able to rise to a surface of the mixture. Sensors, of a type different from the electrical sensor referred to briefly above, are readily available for discriminating between liquid of components of different types. For example, the sensors could detect the specific gravity or pH of liquids comprising the mixture.

Referring again to FIG. 1, the mixture 20 as illustrated in FIG. 1, has a preponderance of a water component 22 and a much smaller component (by volume) of oil. As illustrated in FIG. 1, the oil combines with the alkaline materials in the water and often forms an emulsion or foamy, soapy, sudsy looking isolated "islands" or patches 24 floating on the surface of a water component 22. Additionally, the oil component 24 usually includes a very thin film or layer, i.e. a larger integral mass covering large portions or substantially the entirety of surface area of the liquid contents of holding tank 12. According to some aspects of the present invention, the surface of the liquid mixture contents of holding tank are induced to flow generally in the direction of the arrows 26 shown in FIG. 1. The flow generated in holding tank 12 is generally across the surface of the body of liquid to skim the lighter floating oil which spreads into a thin film covering all of the surface water in this large tank. A distribution pipe 28 has a spaced-apart series of openings 30 which distribute the liquid generally in the downstream direction. As will be seen, the preferred choice for the high momentum liquid is a pressurized water component extracted from the bottom of the separator tank 14 and recirculated in the oil separation apparatus. Therefore, the oil separation apparatus is, with respect to the water component, a closed system. As will be explained in greater detail, the induced flow is a continuous system which constantly recirculates process water from one tank to the other, thus carrying the thin film of oil from the top surface of the larger holding tank and concentrating the removed oil in a small vertical column in the separation tank 14. The water flowing into the tank is discharged by pump 25 to the large holding tank 12.

Referring to FIGS. 1 and 3, a baffle 32 may be positioned adjacent to and generally upstream of a discharge outlet 36. The baffle 32 partitions the surface portion of the holding tank 12 to form a relatively small surface area channel 38 between a baffle 32 and a cut out in the side wall 40 of holding tank 12. As indicated in schematic fashion in FIG. 1, the channel 38 is merely separated from the main surface which may be rough to provide a smoother more channeled outflow from the holding tank 12 into the collection tank 14.

Referring now to FIGS. 4-6, the material flowing into the separator comprises an oil/water mixture and the preferred operation has a "head" in the sense that the water level in the large holding tank 12 is at a slightly higher elevation than the lower water level in the smaller collection tank due to the recirculation action of pump 25. When the water transfer pump 25 is operating the heights of the water levels are such that a thin layer of oil and water continually flows into the tank 14. In a sense, a thin film of water is continually recirculated in a closed system to carry off an even thinner film of oil floating on the water film and the oil is captured and concentrated into a thicker layer in order to be pumped out.

The oil/water mixture flows into a chamber area 42 formed between an underflow weir 44 and the downstream face wall 46 of the separation tank 14. The height or system level of the liquid contents of both holding tank 12 and separation tank 14 are generally controlled by a liquid level sensor in the holding tank. For example, make-up water can be added as significant quantities of water evaporate. The underflow weir 44 located within collection tank 14 is generally positioned such that its upper edge 48 is above the liquid level of the system, and its lower edge 51 is located at a predetermined distance below the level of the heavier, water component in collection tank 14 which prevents backflow of oil to the holding tank.

The flow characteristics of the mixture flowing chamber 42 are such that the mixture follows the direction generally indicated by the arrows 43 in FIGS. 5 and 6. That is, the mixture flowing into the separator is downwardly directed beneath the bottom edge 51 of underflow weir 44. Hence, the downstream weir 44 in collection tank 14 is designated as an underflow weir since the mixture passing the weir is caused to flow thereunder. The liquid flow induced by the transfer pump 25 (FIG. 2) and the outlet 36, weir 44 and chamber 42 are particularly constructed so as to provide a directed momentum sufficient to carry the lighter, oil component under the lower edge of the underflow baffle 44 into portions of tank 14, beneath the upper surface 22' of the water layer therein. Once the oil flows beneath lower edge 51 of the underlow weir, the oil is trapped and rises in the small concentration and collection section of the separation tank. When the recirculation pump shuts down, the water level in the respective tanks 12 and 14 tend to equalize and some liquid on the upstream side 53 of the underflow weir 44 flows back into the holding tank. The collected oil, however, is held by the downstream side 55 of the weir 44 from flowing back into the collection tank.

The lighter liquid component in collection tank 14 rises through the intervening (i.e., overlying) depth of the water component and collects in a layer 54 floating on top of a body of heavier, water component. Thus, underflow weir 44, as can now be seen, confines the concentrated oil layer, preventing its backflow into tank 12. Hence, the lighter liquid component has effectively been concentrated or collected in collection tank 14 in a layer having a depth much greater than the very thin film of oil which was spread over substantially the entire top surface area of the holding tank 12. It is necessary to concentrate the oil for removal so that substantially only oil is removed with little or no water being removed.

Referring especially to FIG. 5, the upper layer 54 of accumulated lighter component usually rises above the surface level 22 in the collection tank section for removal and pushes down the water in collection tank 14, to a level below the level of the operating system. Thus, a very thin film of oil removed from the large holding tank 12 has been collected in the removal section 50 of the separation tank 14 and has been concentrated to a depth that the removal means, which is preferably in the form of a pump 64, may remove only oil rather than a large volume of water with the oil. The operation of the removal means is under the control of a sensing means, preferably in the form of a sensor probe 58, which senses when a sufficient depth of oil is present so that operation of the removal pump 64 causes the pumping of oil only. On the other hand, when the removal pump has removed sufficient oil that the water rises in the removal section to a point that continued pumping would begin to pump water as well as some oil, the sensor probe 58 shuts off the pump 64 until a new accumulation of oil is attained to a predetermined depth.

As illustrated in FIG. 5, the upper water surface 22' lies generally below the bottom end 56 of a sensor probe 58 and also the top end 60 of intake standpipe 62. The intake standpipe 62 is connected to a pneumatically-operated pump 64. Herein, the intake pipe 62 is a vertical pipe having its upper end 60 open and its lower end 61 closed with a central horizontal outlet pipe 63 extending through the tank wall to the pump 64 which may be an elongated, vertical pump which is pneumatically operated. Other pumps may be used to pump the oil. The pump 64 has a discharge pipe 66 which, as illustrated in FIG. 1, discharges into waste receptacle 16. As mentioned, the sensor probe 58 preferably monitors the electrical resistivity of material placed in contact therewith and further is able to discriminate between oil and water. Associated with probe 58 is detection circuitry 68 (FIG. 8) capable of processing the signals received from probe 58 and generating an output signal along electrical wires connected to the pump 64 and its pneumatic control solenoid 87.

The signals transmitted along wires to the control solenoid 87 toggle the extraction pump 64 between on and off positions. For the condition illustrated in FIG. 5, the upper layer 54 of the oil liquid component is in contact with sensor probe 58. The circuitry 68 senses an increased electrical resistivity indicating the presence of a non-polar liquid, herein oil, the extraction of which is accomplished by the apparatus 10. Accordingly, the extraction pump 64 is energized or toggled to an "on" condition to produce a suction in the inlet orifice 60 of intake pipe 62, thereby extracting the oil component from the collection tank, discharging the same into waste receptacle 16. As the upper oil layer 54 is removed by the extraction pump, the upper boundary surface 22' of water component 22 rises in the collection tank until it reaches the bottom 56 of the probe 58, as indicated in FIG. 6. The circuitry 68 senses a decrease in resistivity, an inherent property of the (polar) water component 22. If the extraction pump were allowed to continue operation under these conditions, the oil discharged into waste receptacle 16 would have an increasingly greater water content. Since waste disposal services customarily charge according to the volume of waste material removed from a customer's location, this is generally undesirable for economic reasons. Further, it has been found during prolonged operation of the preferred embodiment that there is no need to replace the water component which, as can be seen, operates as a recirculated carrier of the oil component, facilitating the rapid and highly efficient separation thereof. According to one aspect of the present invention, the lower end of the sensor probe is located slightly below the intake orifice 60 of intake pipe 62 so as to anticipate the approaching upper water boundary 22' before discharge thereof is made in waste receptacle 16. Upon detecting the lowered resistance of the polar liquid component 22, circuitry 68 toggles pump 64 in an "off" or de-energized condition to terminate pumping. During the time that pump 64 is inactivated by circuitry 68, conditions in separation tank 14 are rendered even more quiescent, further enhancing the rapid rise of inflowing oil component to the surface of the contents in separation tank 14.

Thus, it will be seen that the illustrated apparatus has the lower edge 51 of the backflow weir at the deepest location in the tank 14 followed by the lower end 56 of the probe 58 and that the pump inlet orifice 60 of the oil standpipe 62 is at highest position in the tank to assure that the incoming oil is trapped, concentrated and removed without removal of water. By way of example only, the lower edge 51 of the underflow weir 44 is about three inches below the level of the weir 40. The sensor probe lower end 56 is about one-half inch higher and standpipe inlet 60 is another one half-inch higher than the probe lower end 56. The illustrated collection tank is only 12 inches by 14 inches in length and breadth. Tests show that the system will remove about 15 gallons of oil in 15 minutes with a transfer pump 25 pumping 25 gallon/min. through the tank. Tests indicated that about 99% of the removed liquid is oil which is far superior to another system known.

Figure 7:
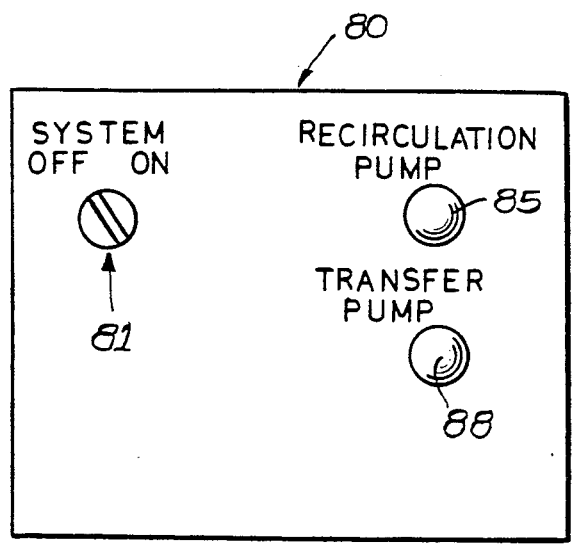
FIG. 7 is an elevational view of a control panel for the apparatus.
Figure 8:
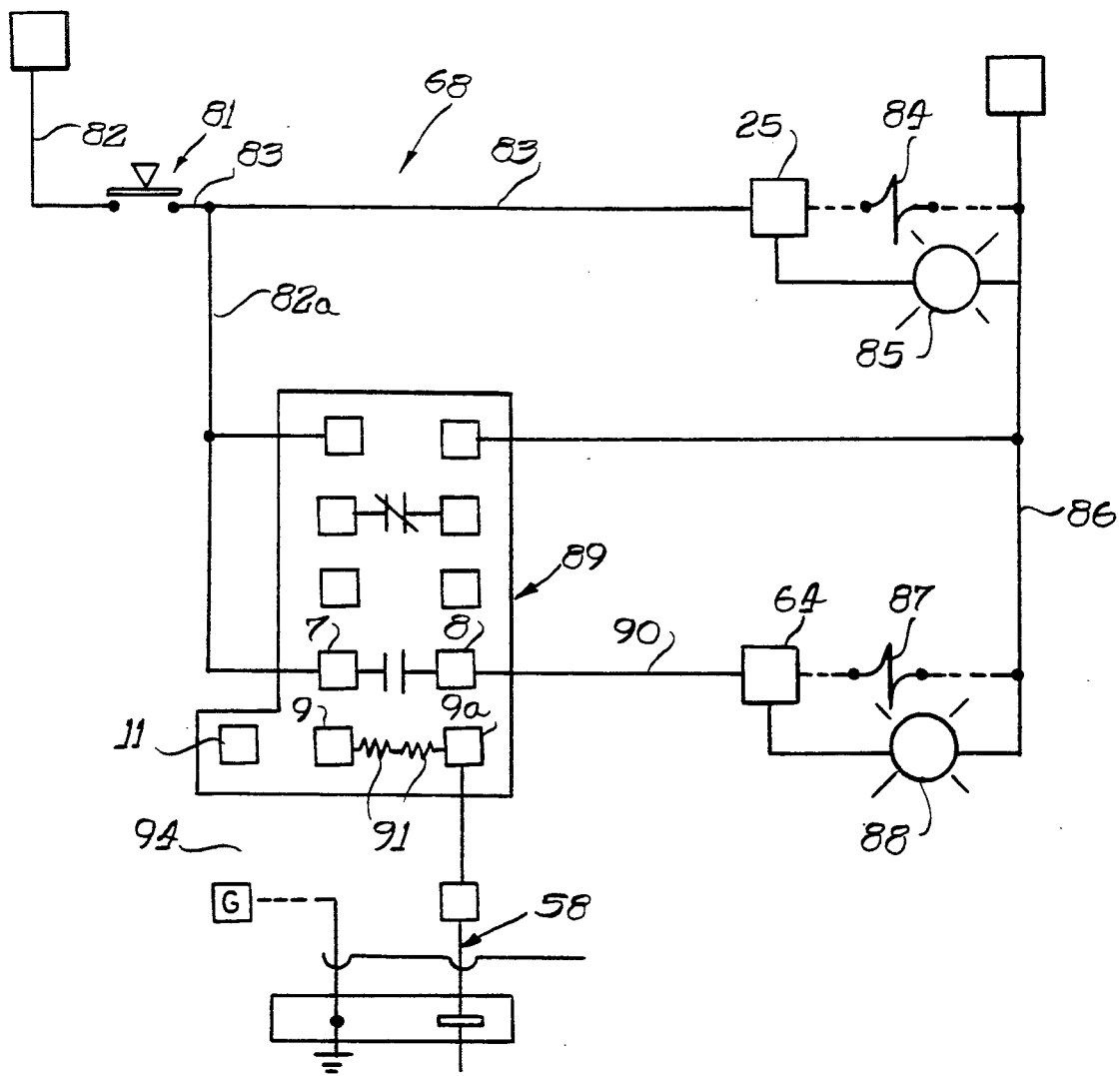
FIG. 8 is a schematic electrical diagram of the control circuit for operation of the recirculation and transfer pumps.

The probe 58 is connected into the operating circuit 68 shown in FIG. 8 and a control panel 80 shown in FIG. 7 indicates the state of the system at any given time. The control panel 80 may be at any given location and is shown herein as mounted to the exterior wall of the main holding tank only for convenience in the description of the panel and its operation. The panel 80 shown in FIG. 7 has the control selector switch 81 which is movable between an on-position and an off-position, and when the selector switch 81 is moved to the on-position a connection is completed from one side of the power line 82 (FIG. 8) across lead 83 to an opposite power line 86 thereby energizing a solenoid 84, which in this instance is an air valve solenoid which causes the operation of the recirculating pump 25. Simultaneously, a glow lamp 85 is operated at the panel 80 to indicate that the recirculation pump is in operation to induce the recirculation flow of water from the separation tank 14 to the main holding tank 12.

A relay 89 is also connected across line 95 and relay contacts 1 and 2 to power lines 82 and 86 and has an internal coil 91 and an internal 2200 ohm resistor 92 connected in series between contacts 9 and 9a. The relay serves to energize and de-energize air control valve solenoid 87 which controls operation of the oil removal and transfer pump 64. When the lower end of the probe 58 is in oil, the circuit is interrupted to the relay internal coil 91 which de-energizes the coil 91 and operates the relay to cause contacts 7 and 8 to close and causes the glow lamp 88 to be lit. More specifically, the circuit is from a power side line 82a through the now closed contacts 7 and 8 of the relay 89 and across the line 90 and through the air control valve solenoid 87 to the opposite power line 86. With air flow valve in its "on" position, the transfer pump is operated so long as the probe is in oil. A contact 11 in the relay is connected by a lead 94 to ground.

When the probe tip engages the water then a circuit is completed from the powerline 82a through the contacts 9 and 9a and through the probe to the water to operate the relay to open the contacts 7 and 8 thereby de-energizing the transfer pump solenoid 87 and closing the air valve to the transfer pump and causing the glow lamp 88 to extinguish which indicates the transfer pump 64 is not operating and is not pumping liquid from the separator tank to the barrel 16. Hence, water will not be pumped by transfer pump 64 into the oil collection container. The illustrated operational circuit for the respective recirculation pump 25 and transfer pump 64 is merely representative and other circuits could be used and still fall within the ambit of the invention.

As an option, in order to provide increased hysteresis in the operating system so as to allow a significantly thick upper layer 54 of oil to be collected before energizing extraction pump 64, a time delay circuit can be initiated upon detecting the non-polar liquid at the lower end 56 of center probe 58. Alternatively, a second probe having an operative end generally below the end 56 illustrated in the Figures, can be provided. The second probe would provide the energizing signal for toggling pump 64 in an "on" condition. Other arrangements for increasing the hysteresis of the oil separation apparatus 10 will become apparent to those skilled in the art.

In any event, the second probe sending an "on-signal" to pump 64 located below the bottom end 56 of probe 58, is located above the bottom end 50 of underflow weir 44 which also operates to prevent a backflow of oil into collection tank.

The recirculation of the water from the collection tank 14 to the holding tank 12 is accomplished by withdrawing water through a discharge pipe 74 (FIG. 2) located in separation tank 14 at a point below the bottom end 50 of underflow weir 44. The recirculation pipe 74 is connected through the transfer or recirculation pump 25 which pumps the water in a pressurized flow through pipe 75 which is connected to distribution pipe 28, thus completing the closed recirculation system referred to above. The illustrated pipe 74 and transfer pump 25 assist in the induction of flow underneath the underflow weir 44 and into collection tank 14, in the directions generally indicated by the arrows in FIGS. 4-6. The distribution pipe 28 has holes therein which are not nozzles that could easily plug, but which do direct spray across the width of the holding tank.

As described above, outflow injected into the separation tank enters at a depth below the upper surface of the heavier component(s) therein which have separated to lower layers in the collection tank. This has been found to provide the most efficient separation of many types of oil/water mixtures. It is possible, however, that some oil/water mixtures separate readily even when introduced into the upper layer of lighter liquid, or even at the surface thereof, with the heavier component(s) of the mixture falling beneath the Light upper layer without mixing with or emulsifying the lighter material. The underflow weir could still be employed to prevent backflow, and care must still be taken to prevent emulsification or other inter-liquid suspension in the collection tank. If outflow is discharged adjacent the upper layer of the collection tank, care must be taken to inhibit energizing the extraction pump until the newly added outflow has had a chance to "settle out." This can be done with time delay apparatus, or with flow measuring or liquid velocity apparatus monitoring the upper level and/or surface of the collection tank.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A method for separating a light first liquid from a heavier second liquid in a mixture of these liquids, said method comprising:
    providing a holding tank holding a large body of the second liquid and having a large top surface with said first liquid floating thereon,
    flowing a thin flow of said first and second liquids across the large top surface of the holding tank,
    flowing the first and second liquids from the holding tank into a smaller separator tank having an underflow weir and dividing the separating tank into a first inlet portion having a liquid height less than the height of the large surface of liquids in the holding tank,
    flowing downwardly through said first inlet portion the combined first and second liquids with sufficient momentum to travel beneath a lower edge of the underflow weir into a collecting portion of the separator tank,
    said flowing of the combined liquids beneath the lower edge of the underflow weir including flowing the combined liquids with a flow momentum at the inlet side of the weir to create a liquid height less than the liquid height on the other side of the weir in the collecting portion of the separator tank, the upper portion of the weir preventing backflow from the collecting portion into the inlet portion of the separator tank,
    concentrating the light first liquid in the collecting portion of the smaller separator tank having a surface area substantially smaller than the surface area of the large surface in the holding tank,
    sensing a predetermined accumulation of the light first liquid by a sensing means in an upper portion of the collecting portion of the smaller separator tank,
    preventing backflow of the light first liquid to the holding tank by an upper portion of the underflow weir,
    operating a removal means by the sensing means to remove substantially only the light first liquid from the upper portion of the collecting portion, and
    pumping the second heavier liquid from a bottom portion of the separating tank back to the holding tank thereby recirculating a thin film flow of said second heavier liquid across the top surface of the holding tank and providing in part the momentum necessary for said combined liquids to travel beneath the lower edge of said underflow weir.

2. A method in accordance with claim 1 in which the first liquid is oil and in which the second liquid is water, and including the step of exposing both the water and oil to ambient atmosphere in the holding and separating tanks.

3. A method in accordance with claim 2 including the step of providing a substantially smaller separation tank than the holding tank and concentrating the flow from the large surface of the holding tank into a small stream to flow into the separation tank.

* * * * *